United States Patent
Koste et al.

(10) Patent No.: US 10,527,784 B1
(45) Date of Patent: Jan. 7, 2020

(54) SYSTEMS AND METHODS FOR PROVIDING A STABLE WAVELENGTH REFERENCE IN AN INTEGRATED PHOTONIC CIRCUIT

(71) Applicant: General Electric Company, Schenectady, NY (US)

(72) Inventors: Glen Peter Koste, Schenectady, NY (US); Hendrik Pieter Jacobus de Bock, Clifton Park, NY (US); Cheng-Po Chen, Niskayuna, NY (US)

(73) Assignee: GENERAL ELECTRIC COMPANY, Niskayuna, NY (US)

(*) Notice: Subject to any disclaimer, the term of this patent is extended or adjusted under 35 U.S.C. 154(b) by 0 days.

(21) Appl. No.: 16/192,472

(22) Filed: Nov. 15, 2018

(51) Int. Cl.
| | |
|---|---|
| *G02B 6/12* | (2006.01) |
| *G02B 6/124* | (2006.01) |
| *G01K 1/14* | (2006.01) |
| *G01K 11/32* | (2006.01) |
| *G02B 6/02* | (2006.01) |
| *G02B 6/42* | (2006.01) |
| *G01B 11/16* | (2006.01) |
| *G01J 1/44* | (2006.01) |
| *G02B 6/293* | (2006.01) |

(52) U.S. Cl.
CPC ............ *G02B 6/12* (2013.01); *G01K 1/14* (2013.01); *G01K 11/3206* (2013.01); *G02B 6/02176* (2013.01); *G02B 6/124* (2013.01); *G02B 6/4266* (2013.01); *G01B 11/165* (2013.01); *G01J 2001/446* (2013.01); *G02B 6/29338* (2013.01); *G02B 6/29352* (2013.01); *G02B 2006/12061* (2013.01); *G02B 2006/12107* (2013.01); *G02B 2006/12121* (2013.01); *G02B 2006/12123* (2013.01); *G02B 2006/12135* (2013.01); *G02B 2006/12138* (2013.01)

(58) Field of Classification Search
None
See application file for complete search history.

(56) References Cited

U.S. PATENT DOCUMENTS

| | | | |
|---|---|---|---|
| 5,194,847 A | | 3/1993 | Taylor et al. |
| 5,673,129 A | | 9/1997 | Mizrahi |
| 5,832,156 A | * | 11/1998 | Strasser ................ G01J 3/1895 385/48 |
| 5,892,582 A | * | 4/1999 | Bao .................... G01D 5/35383 250/227.27 |

(Continued)

FOREIGN PATENT DOCUMENTS

WO    2017190063 A2    11/2017

OTHER PUBLICATIONS

Lawton, K.M., et al.; "Long-term relative stability of thermistors", IEEE Journal of Selected Topics in Quantum Electronics, vol. 25, Issue: 1, pp. 24-28, 2001.

(Continued)

*Primary Examiner* — Michael Stahl
(74) *Attorney, Agent, or Firm* — Fletcher Yoder, P.C.

(57) ABSTRACT

Aspects of the present disclosure are directed toward designs and methods improving optical sensing, wavelength division multiplexed (WDM) telecommunication transceivers, WDM add/drops, and spectrometer techniques that may benefit from a stable wavelength reference. The disclosed designs and methods are useful in the manufacture of a stable wavelength reference that may compensate for temperature variations.

20 Claims, 10 Drawing Sheets

(56) References Cited

U.S. PATENT DOCUMENTS

| | | | | |
|---|---|---|---|---|
| 6,403,949 | B1* | 6/2002 | Davis | G01J 1/18 |
| | | | | 250/227.27 |
| 6,504,616 | B1* | 1/2003 | Haber | G01J 3/26 |
| | | | | 356/480 |
| 7,259,031 | B1 | 8/2007 | Dickinson et al. | |
| 7,616,850 | B1 | 11/2009 | Watts et al. | |
| 8,213,751 | B1 | 7/2012 | Ho et al. | |
| 8,787,417 | B2 | 7/2014 | Baets et al. | |
| 9,513,437 | B2 | 12/2016 | Zhang et al. | |
| 9,964,703 | B2 | 5/2018 | Parker et al. | |
| 2006/0239612 | A1 | 10/2006 | De Dobbelaere et al. | |
| 2007/0159638 | A1* | 7/2007 | Zeng | G01J 3/02 |
| | | | | 356/480 |
| 2016/0033360 | A1* | 2/2016 | Taverner | G01D 5/35387 |
| | | | | 356/73.1 |

OTHER PUBLICATIONS

Pertijis, Michiel A.P., et al.; "A CMOS Smart Temperature Sensor With a 3 Inaccuracy of 0.1C from—55C to 125C", IEEE Journal of Solid-State Circuits, vol. 40, No. 12, Dec. 2005.

Lui, Ansheng, et al.; "Wavelength Division Multiplexing Based Photonic Integrated Circuits on Silicon-on-Insulator Platform", Precision Engineering, vol. 16, Issue: 1, pp. 23-32, 2010.

Hu, Run, et al.; "Local Heating Realization by Reverse Thermal Cloak", Scientific Report, 4:3600; DOI:10.1038; 6 pages, 2014.

Baets, Roel, et al.; "Silicon photonics: Silicon nitride versus silicon-on-insulator", 2016 Optical Fiber Communications Conference and Exhibition (OFC), pp. 1-3, USA, 2016.

* cited by examiner

US 10,527,784 B1

SYSTEMS AND METHODS FOR PROVIDING A STABLE WAVELENGTH REFERENCE IN AN INTEGRATED PHOTONIC CIRCUIT

STATEMENT REGARDING FEDERALLY SPONSORED RESEARCH & DEVELOPMENT

This invention was made with Government support under contract number FA8650-15-2-5220 awarded by the Air Force Research Laboratories. The Government has certain rights in the invention.

BACKGROUND

The subject matter disclosed herein relates to systems and methods for improving optical sensing, wavelength division multiplexed (WDM) telecommunication transceivers, WDM add/drops, and spectrometer techniques that may benefit from a stable wavelength reference.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In optical sensing systems, sensors (e.g., fiber Bragg gratings) are leveraged to measure optical signals. For example, an optical sensing system may generate a light from a laser source, transmit the light through an external sensor, and sense (or estimate) a wavelength of the light received from the external sensor. The sensed wavelength may be analyzed by a computing device of the optical sensing system and used to determine a parameter at the sensor's location, such as strain level or temperature. While useful, these the optical sensing systems are typically large, bulky, and expensive pieces of equipment, even when not employing fiber-optic sensors.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, embodiments may encompass a variety of forms that may be similar to or different from the embodiments set forth below.

In one embodiment, an integrated photonic circuit may include a wavelength reference coupled to a source of light with spectral content that estimates a first wavelength of light. The integrated photonic circuit may also include a temperature sensor. The temperature sensor may sense a temperature associated with the wavelength reference. The integrated photonic circuit may also include a processing component that performs an adjustment to the estimate of the first wavelength of light based at least in part on the sensed temperature.

In another embodiment, a method may include operating a light source to emit light into an integrated photonic circuit including active circuitry that emits heat during an operation; transmitting a first portion of the light to a wavelength reference, where the wavelength reference has a sensitivity to the heat from the active circuitry; estimating a wavelength value of the second portion of the light; determining an operating temperature associated with a time at which a peak light energy of the first portion of light was transmitted into the wavelength reference; determining an adjustment to apply to an estimate of the wavelength value of the second portion of the light based at least in part on the operating temperature and a known temperature dependence of the wavelength reference; and compensating for a change in performance by the wavelength reference caused by temperature variation by applying the adjustment to the estimate of the wavelength value of the second portion of the light to generate an absolute wavelength value.

In yet another embodiment, a device may include active circuitry coupled to a wavelength reference. The wavelength reference may include a waveguide structure formed from a material sensitive to temperature variations caused by a thermal gradient associated with the active circuitry. The wavelength reference may also include a temperature sensor disposed near the waveguide structure. The temperature sensor may sense an ambient temperature near the waveguide structure.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
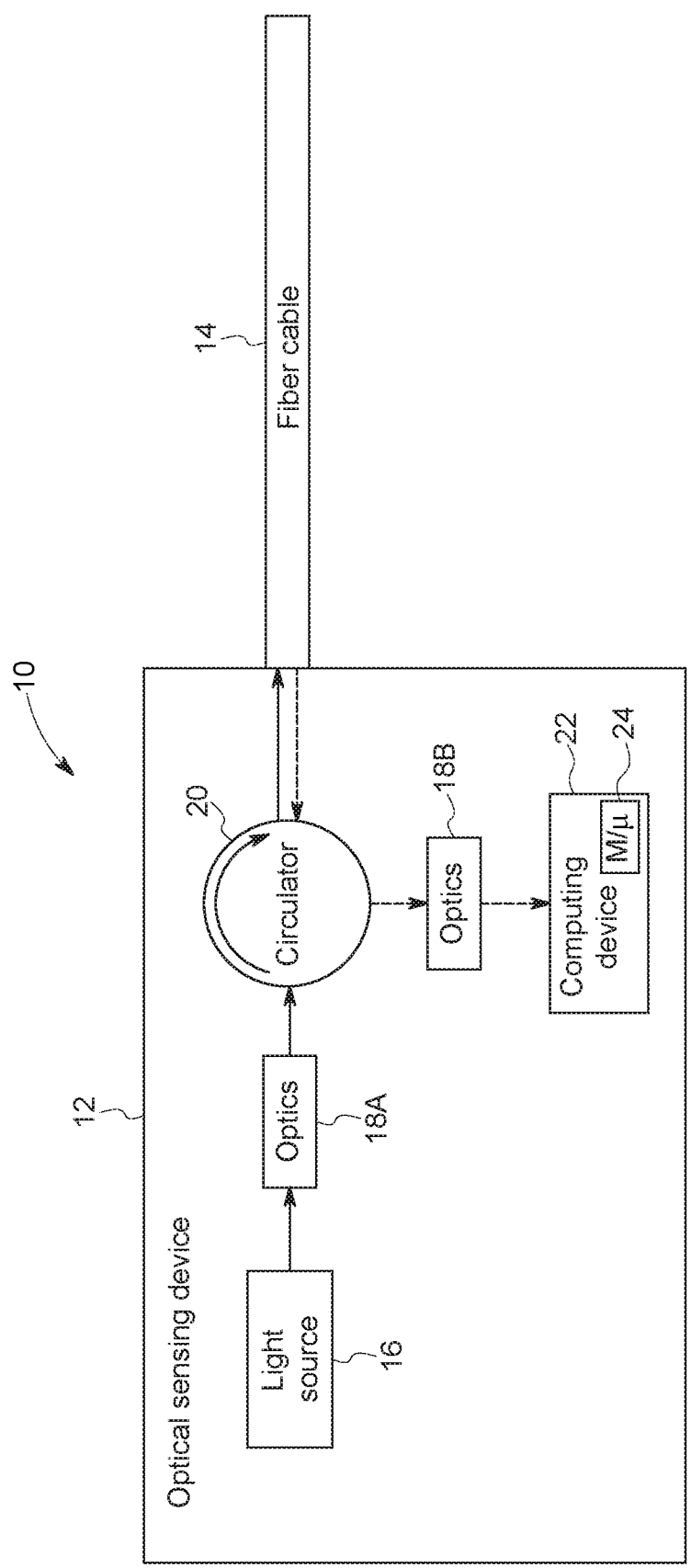
FIG. 1 is a block diagram of an optical sensing system, in accordance with aspects of the present approach.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are related to an integrated photonic circuit that includes a wavelength reference for use in sensing operations. Generally, an optical sensing system may include one or more dedicated light sources and/or laser generation devices, optical receivers, and other optical components and equipment. However, the optical sensing system equipment may be large, cumbersome, and/or expensive. Integrating the optical sensing system onto an integrated photonic circuit may enable increasing complex optical and electrical circuits to be packed into smaller volumes and/or smaller footprints (e.g., smaller relative to current non-integrated optical equipment). An integrated photonic circuit may include various active structures such as one or more light sources, one or more modulators, one or more tunable filters, one or more photodiodes, one or more electronic chips, or the like. The integrated photonic circuit may also include various passive structures such as one or more waveguide structures, one or more splitters, one or more Mach Zehnder interferometers, one or more Bragg gratings (e.g., spiral Bragg gratings), one or more ring filters, one or more edge filters, or the like. The active features may introduce a thermal gradient to the integrated photonic circuit. The thermal gradient may lead to uncertain and unpredictable temperature variations between portions of the integrated photonic circuit. The thermal gradient may persist even if a thermo-electric cooler is included in the integrated photonic circuit.

Many optical applications for the integrated photonic circuit may use precise wavelength control of light sources and filters (e.g., may use a determination of an absolute wavelength in one or more computations), one example of which is an integrated photonic circuit to perform optical sensing operations such as measuring fiber Bragg gratings to sense temperature and strain. Additional examples of systems that may use precise wavelength control of an integrated photonic circuit include sensor interrogators, wavelength division multiplexed (WDM) telecommunication transceivers, WDM add/drops, spectrometers, or the like. Placing a wavelength reference on the integrated photonic circuit for reference in these optical applications may be problematic because of the unpredictability of the effect of the thermal gradient on the wavelength of light outputted by the wavelength reference.

Keeping the foregoing in mind, embodiments of the present disclosure describe systems and methods that account for the temperature gradient when providing a wavelength reference. Sometimes a wavelength reference may include a waveguide structure formed from a material that is less sensitive (e.g., sufficiently low sensitivity) to temperature variations caused by the thermal gradient, such as silicon nitride (SiN), silica, or the like. The waveguide structure may be a variety of suitable geometries, including a Bragg grating having a spiral shape or other suitable shape, an unbalanced Mach Zehnder interferometer, a ring resonator, an edge filter, or the like. In some embodiments, the wavelength reference includes a waveguide structure using similar geometries but is formed using materials that are more sensitive to temperature variations caused by the thermal gradient, such as silicon, or indium phosphide, or the like. In these situations, the wavelength reference may be affected by temperature changes in non-negligible ways. Thus, it may be desired to compensate for temperature variations experienced by the wavelength reference. Even if materials that are less sensitive to temperature are used, some systems may still benefit from temperature compensation, for example, systems with particularly stringent requirements. In these cases, the wavelength reference may also include a temperature sensor, such as one or more semiconductor p-n junction diodes, one or more transistors, one or more photodiodes, one or more thermistors, one or more resistance temperature detectors (RTDs), or the like, to sense a temperature of the integrated photonic circuit at the wavelength reference. The temperature measurement may then be used to determine an adjustment to perform to a wavelength of a light output from the waveguide structure based on the temperature of the wavelength reference. In some embodiments, the adjustment is determined during a calibration period based on a relationship between light outputs from the wavelength reference at different temperature and an amount of deviation between a wavelength of the light output and a designed wavelength of the wavelength reference. Performing an adjustment to a measured wavelength based on a temperature during transmission of the light through the wavelength reference may compensate for wavelength variances of light output from the wavelength reference, thus improving on wavelength references used in an integrated photonic circuit.

By way of introduction, FIG. 1 is a block diagram of an optical sensing system 10 that, as described above, may be functionally replicated using an integrated photonic circuit, as described in more detail before with FIGS. 2 through 10B. The optical sensing system 10 may include an optical sensing device 12 that generates a light for transmission through a fiber cable 14 to measure sensors along the cable designed to affect the wavelength of the reflected light. The optical sensing device may also be known as an interrogator. Sometimes the fiber cable 14 may be contained within a capillary tube to help protect the fiber cable 14 from physical material, such as dirt, ground, rain, or the like. Although described as one fiber-optic sensing path, it should be understood that the optical sensing system 10 may include one or more of each depicted components to provide one or more fiber-optic sensing paths that may or may not be grouped together. Moreover, although a single light (e.g., light pulse) is described, it should be understood that in operation one or more lights (e.g., light pulses) may be transmitted and measured to interrogate the length of the fiber cable 14. It should be understood that the fiber cable 14 may be disposed within or near a variety of materials, structures, or the like, to facilitate performing sensing operations. For example, a fiber cable 14 may be disposed on a turbine blade to sense strain associated with the turbine blade.

As shown in FIG. 1, the optical sensing system 10 may include a light source 16 that generates a light for transmission via one or more transmission structures (e.g., fiber cable, waveguides) through optics components 18 (e.g., 18A, 18B) and a circulator 20 before transmitting through the fiber cable 14. The light source 16 may be a semiconductor laser that produces one or more light pulses into a transmission structure for transmission through the optics component 18A. The optics components 18 may include a variety of suitable optical processing components such as one or more variable attenuators, one or more pump filters, one or more erbium-doped fiber amplifiers (EDFAs), one or more couplers, one or more pulser components, one or more faraday mirrors, one or more compensator components, one or more discrete fiber-coupled devices, one or more pump lasers, or the like. Furthermore, the optic components 18 may include combinations of the listed components. For example, an EDFA may include one or more pumps lasers and one or more wavelength couplers, in addition to fiber-optic components such as a coil of erbium-doped fiber cable. After optical processing, the light may be transmitted through the circulator 20.

The circulator 20 may be any suitable component that permits light transmission in a forward direction from a first point to a second point and that permits light transmission in a reverse direction from the second point to a third point but that does not permit light transmission in a reverse direction from the second point to the first point. For example, the light transmitted from the optics component 18A may proceed through the fiber cable 14 and may return to the optics component 18B without proceeding through the optics component 18A.

The light transmitted via the fiber cable 14 may be sensitive to temperature or strain. After the light scatters back from the fiber cable 14, the circulator 20 receives the light and directs the light to the optics components 18B for optical processing. After optical processing, the light is transmitted from the optics components 18B to a computing device 22 associated with the optical sensing device 12.

The computing device 22 and/or the optics component 18B may facilitate performing one or more processing operations on the light that is returned to enhance detection sensitivity of the sensing. The computing device 22 may include memory and/or processing circuitry 24 to perform the processing operations. The memory and/or processing circuitry 24 may also store one or more results from the sensing operation performed by the optical sensing system 10. In some embodiments, optics components 18 include one or more components to facilitate providing a reference light such that the computing device 22 may use the reference light to perform processing operations. For example, discerning an optical response, or the response of the fiber cable 14 to temperature or strain as determined through the wavelength of the light received by the computing device 22 from the circulator 20, may include comparing a determined wavelength of light output from the wavelength reference or the reference light providing a known interference value to a measured wavelength of returned light (e.g., from the end of the fiber cable 14).

Figure 2:
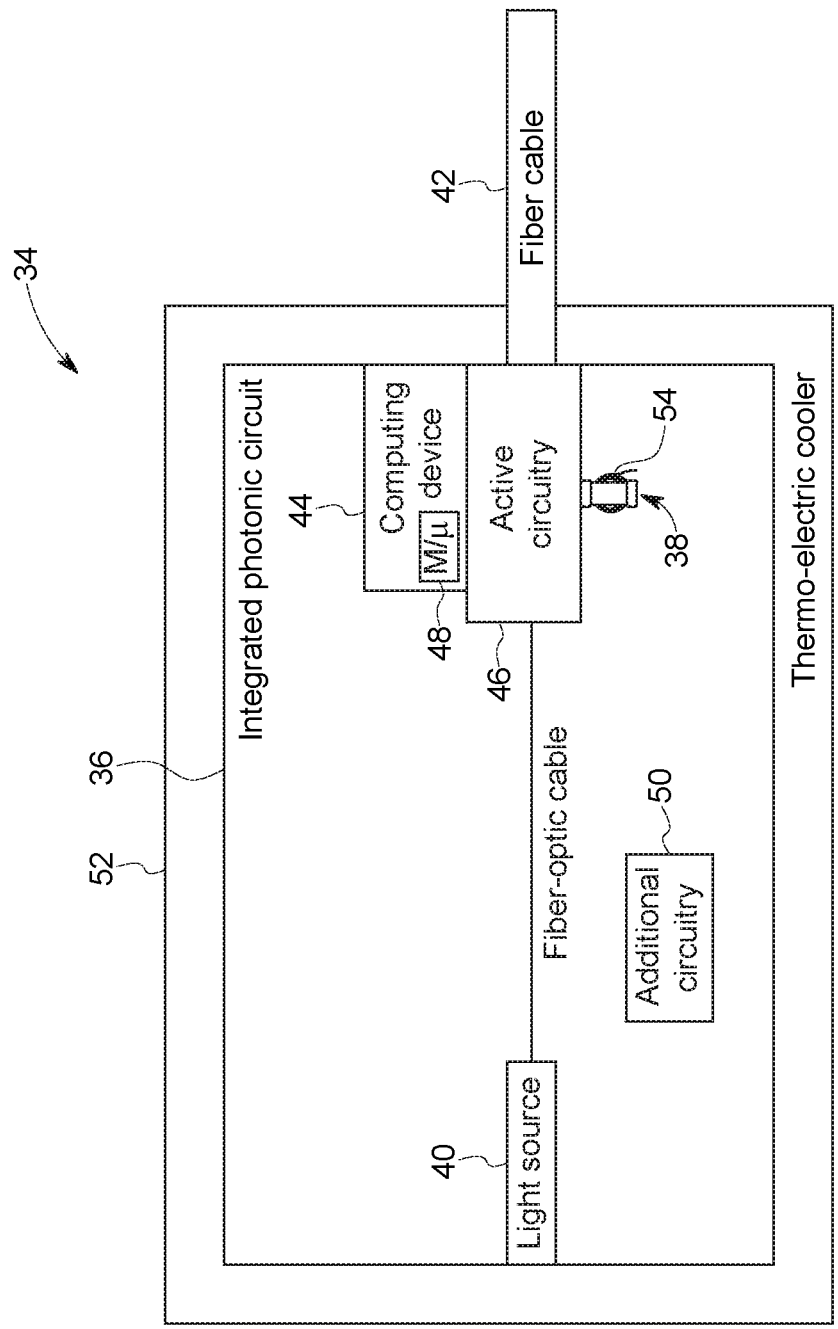
FIG. 2 is a block diagram of an integrated photonic circuit and a wavelength reference to perform similar optical sensing operations, as described in relationship with the optical sensing system of FIG. 1, in accordance with aspects of the present approach.

The optical sensing device 12 may be functionally replicated using integrated photonic circuit components to yield an improved system that may be smaller and cheaper to manufacture than the non-integrated optical sensing device 12. To illustrate, FIG. 2 is a block diagram of an optical sensing system 34 that includes an integrated photonic circuit 36 and a wavelength reference 38 to perform similar optical sensing operations as the optical sensing device 12. In this example, the optical sensing system 34 may include a light source 40 that generates a light (e.g., a light pulse, a laser pulse) for transmission through a fiber cable 42. Similar to as described above, the light may be used to measure the wavelength of a concatenation of fiber Bragg gratings. The integrated photonic circuit 36 may include the wavelength reference 38 to facilitate a computing device 44 in performing sensing operations.

A portion of the fiber cable 42 used to sense strain or temperature may be protected within a capillary tube, for example, to protect the fiber cable 42 from physical materials. Although described as one fiber-optic sensing path, it should be understood that the depicted fiber-optic sensing path may include one or more of each depicted components to provide one or more fiber-optic sensing paths that may or may not be grouped together for sensing, such as in a same capillary tube. Moreover, although a single light is described, it should be understood that one or more lights or light pulses may be transmitted and measured to interrogate the length of a fiber cable 42.

Explaining operation of the integrated photonic circuit 36, the light source generates a light that is transmitted to active circuitry (actives) 46 internal to the integrated photonic circuit 36. This example incorporation of the optical sensing device 12 into the integrated photonic circuit 36 includes one or more components to perform similar functions as to the non-integrated components. These photonics-compatible components are described as the active circuitry 46. The active circuitry 46 process and direct the light from the light source 40 to the fiber cable 42. The active circuitry 46 may include various active structures such as one or more modulators, one or more tunable filters, one or more photodiodes, one or more electronic chips, or the like. It is noted that, in some embodiments, active circuitry 46 may also include one or more passive structures such as waveguides, splitters, Mach Zehnder interferometers, Bragg gratings, ring filters, or the like.

From the active circuitry 46, the sensing light is transmitted within a length of the fiber cable 42. The laser pulse reflects off the concatenation of fiber Bragg gratings on fiber cable 42 and is returned for signal processing within the active circuitry 46. The computing device 44 may process an electrical signal (e.g., digital signal, analog signal) generated in response to the received light (e.g., returned optical signal, back-scattered light returned from fiber cable 42). The computing device 44 may be similar to the computing device 22 of FIG. 1 and include memory and/or processing circuitry 48 to perform one or more sensing operations. Some embodiments may also include additional circuitry 50 such as one or more tunable filter drivers, one or more phase shifter drivers, one or more transimpedance amplifiers, or the like.

The active circuitry 46 and/or the additional circuitry 50 may introduce a thermal gradient to the integrated photonic circuit 36. The thermal gradient may lead to uncertain (e.g., unpredictable) temperature variations between portions of the integrated photonic circuit 36. The thermal gradients may persist even when a thermo-electric cooler 52 is included in the integrated photonic circuit 36 to offset some of the effects of the thermal gradient. In addition, the thermal gradients may affect reliability and/or performance of the wavelength reference 38 because of the unpredictability of the temperature caused by the thermal gradient. For example, temperature variations may cause a change in an index of refraction. In this way, the thermal gradient may affect the optical properties (e.g., wavelength) of the light to be used as a stable reference in a manner that may cause a decrease in reliability of sensing operations. Thus, it may be desirable to use systems and methods to compensate for temperature variations caused at least in part by the active circuitry 46 and/or the additional circuitry 50 included, for example, to integrate the optical sensing device 12 into the integrated photonic circuit 36.

One example of a temperature variation compensation technique is including a temperature sensor 54 with the wavelength reference 38. Many components may be used as the temperature sensor 54, such as a thermistor or a photodiode. In some embodiments, the wavelength reference 38 and/or the temperature sensor 54 are disposed on an underfill material (e.g., epoxy, thermal grease, micro-gap pad) to provide good thermal contact to facilitate providing a temperature measurement representative of the temperatures affecting light transmission via the wavelength reference 38. Thus, the temperature sensed by the temperature sensor 54 may be communicated to the computing device 44.

For example, Equation 1 models the behavior of the temperature sensor 54 when a thermistor is used to sense the temperature variations:

$$R_T = R_0 e^{B\left(\frac{1}{T} - \frac{1}{T_0}\right)} \quad [1]$$

In Equation 1, $R_0$ may be a recorded resistance of the thermistor at an initial temperature, $R_T$ may be a recorded resistance of the thermistor at a final temperature, B may be a constant, T may be the final temperature associated with the thermistor, and $T_0$ may be the initial temperature associated with the thermistor. Thus, as an example, the temperature sensor 54 may sense the temperature based at least in part on a change in resistance from a resistance determined at an initial temperature.

The memory and/or processing circuitry 48 may use the sensed temperature to determine an adjustment to compensate for temperature variation. For example, the adjustment may include decreasing or increasing a determined wavelength measurement or estimate by a pre-determined amount based on the temperature associated with the wavelength reference 38. In this way, light transmitted within the wavelength reference 38 may have a wavelength that deviates from an expected wavelength of the wavelength reference 38. The adjustment may be performed to the determined or estimated wavelength such that the value after the adjustment is an expected wavelength value for the wavelength reference 38 (e.g., a wavelength value that the wavelength reference 38 was designed to output). One or more adjustments and/or pre-determined adjustment amounts may be defined based at least in part on known temperature dependences of the wavelength reference 38.

These known temperature dependencies may be determined during a calibration process or by any other suitable manner. For example, the known temperature dependence of the wavelength reference 38 may be known based at least in part on the optical, mechanical, and/or material properties of the wavelength reference 38, or through measurements, such as measurements made to record a response of the wavelength reference 38 to calibration conditions and/or calibration light. One technique for calibration includes sweeping the wavelength of the light source 40 and measuring the output light from the wavelength reference 38 with a calibrated wavelength meter. Through knowledge of the wavelengths and the temperatures, temperature dependence of the wavelength reference 38 may be able to be extrapolated and used to determine suitable adjustments.

Figure 3:
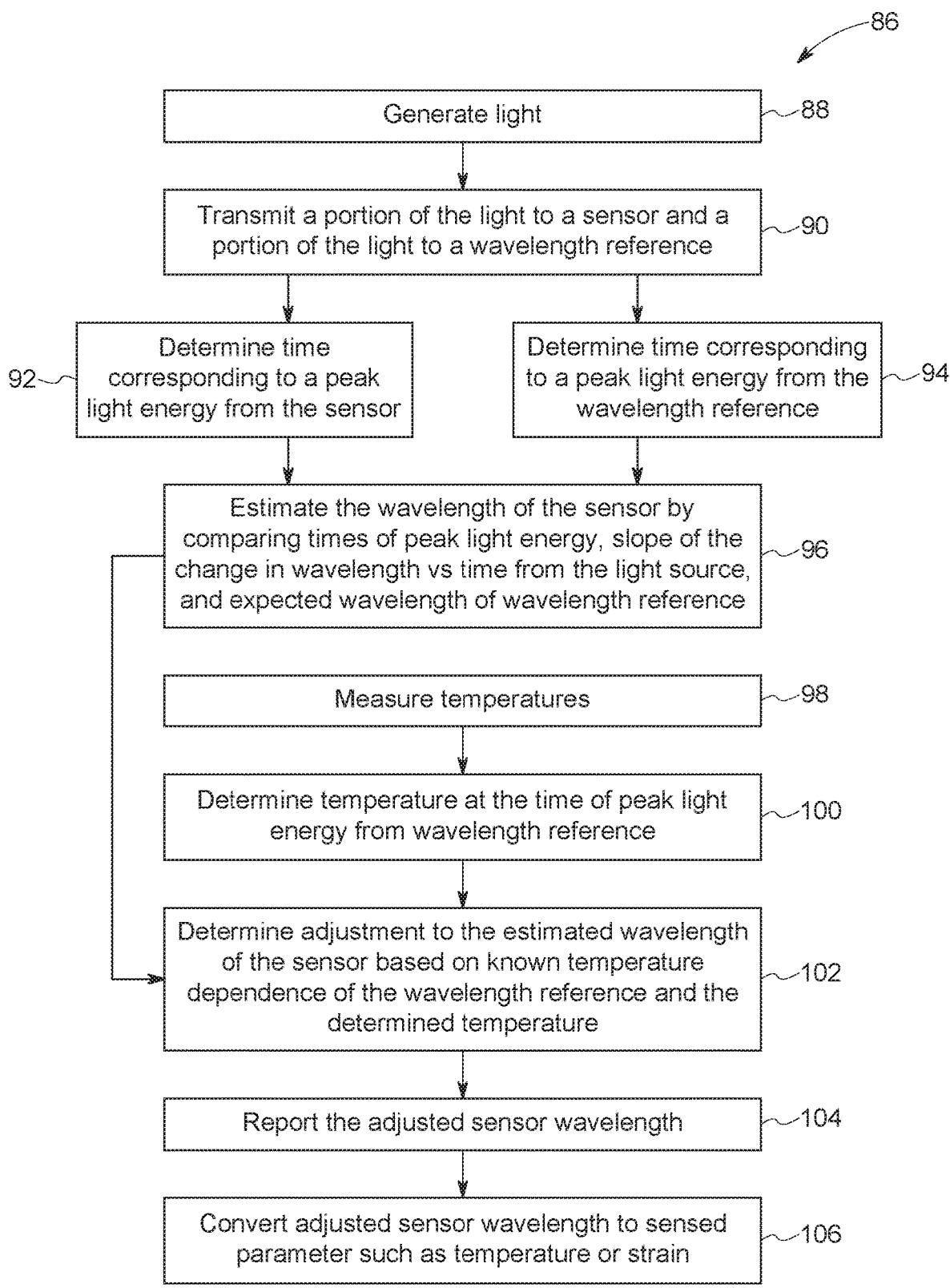
FIG. 3 is a flowchart of a method for operating the integrated photonic circuit of FIG. 2, in accordance with aspects of the present approach.

To help describe operation of the optical sensing device 34, FIG. 3 is a flowchart of a method 86 for operating the integrated photonic circuit 36 and/or the optical sensing system 34. Although the following description of the method 86 is detailed in a particular order to facilitate explanation, it should be noted that the steps of the method 86 may be performed in any suitable order. Moreover, although the method 86 is described as being performed by the computing device 44, it should be understood that the method 86 may be performed by any suitable computing device or controller.

At block 88, the computing device 44 and/or suitable controller may operate the light source 40 to generate light (e.g., light pulse, laser formed from light) to the active circuitry 46. Operating the light source 40 to transmit light may involve tuning the light source 40 to transmit the light by sweeping across wavelengths within specified band of interest. In this way, the generated light may vary in wavelength over time (e.g., varying wavelength vs. time).

At block 90, the computing device 44 and/or suitable controller may operate one or more components of the optical sensing system 34 to transmit a portion of the generated light to the wavelength reference 38 and a portion of the generated light to sensors associated with the fiber cable 42. The computing device 44 and/or suitable controller may operate components included within the active circuitry 46 to perform the splitting or passive components may be used to split the generated light. For example, a splitter component may be used to transmit a portion of the light to the wavelength reference 38. After transmitting a portion of the light to the wavelength reference 38 and to the sensor, conversion circuitry may convert the respective portions of the light into one or more electrical signals for interpretation by the computing device 44 and/or suitable controller.

At block 92 and block 94, the computing device 44 and/or suitable controller may determine times corresponding to a peak light energy detected in the generated light by sensors associated with the wavelength reference and the sensors associated with the fiber cable 42. The computing device 44 and/or suitable controller may determine a first peak light energy as a relative maximum of the light transmitted to the wavelength reference and a second peak light energy as a relative maximum of the light transmitted to the sensors. The computing device 44 and/or suitable controller may perform one or more processing operations to determine peak light energies of the different lights. Using the peak light energies, the computing device 44 and/or suitable controller may determine a time corresponding to when the respective peak light energies occurred.

At block 96, the computing device 44 and/or suitable controller may estimate the wavelength of the sensor by comparing the times of peak light energy (e.g., determined at block 92 and at block 94), a slope of the change in wavelength vs. time from the light source 40, and an expected wavelength of the wavelength reference 38. The slope of the change in wavelength vs. time and the expected wavelength of the wavelength reference 38 may be programmed values and/or predetermined values based on the specific application of the optical sensing system 34. Thus, the wavelength of the sensor is estimated using a combination of sensed and known parameters.

Substantially simultaneously to performing operations associated with at some of the blocks 88-96, the computing device 44 and/or suitable controller, at block 98, may measure temperatures associated with the wavelength reference 38 over time. The temperature sensor 54 may sense temperatures over time and may transmit sensed values to the computing device 44 and/or suitable controller for further analysis or storage. In some embodiments, the temperature sensor 54 locally stores the temperatures over time such that the computing device 44 and/or suitable controller may access temperature records during processing or analysis operations. The temperature sensor 54 may output the temperatures as a temperature output.

At block 100, the computing device 44 and/or suitable controller may receive or access the temperature output and determine a temperature at the time corresponding to the peak light energy from the wavelength reference 38. The temperature is thus the temperature of at least a portion of the wavelength reference 38 at the time determined at the block 94. The computing device 44 and/or suitable controller receives the temperature data from the temperature sensor 54 and maintains its own historical temperature data records. In some embodiments, the computing device 44 and/or suitable controller may query the temperature sensor 54, such as a thermistor, to access historical temperature data records associated with the wavelength reference 38. The computing device 44 and/or suitable controller may perform a look-up operation or other suitable function to match the time to the temperature of the wavelength reference 38.

At block 102, the computing device 44 and/or suitable controller may use one or more known temperature dependencies of the wavelength reference 38 and the determined temperature (e.g., from the block 100) to determine an adjustment to the estimated wavelength (e.g., determined at the block 96). For example, the computing device 44 and/or suitable controller may adjust, change, increment, decrement, or the like, the estimated wavelength value to determine an absolute wavelength value based at least in part on the peak light energy from the sensor, the peak light energy from the wavelength reference 38, the time of the peak light energy from the sensor, the time of the peak light energy from the wavelength reference 38 at the time of the peak light energy from the wavelength reference 38, or any combination thereof. The adjustment is used by the computing device 44 and/or suitable controller to adjust the value of the estimated wavelength to compensate for temperature variations. For example, in some embodiments, the absolute wavelength value determined by the computing device 44 and/or suitable controller may be used as a temperature-stable reference wavelength for the one or more photonic circuit operations. For example, sensing interrogator circuitry, spectrometer circuitry, wave division multiplexing circuitry, wave division multiplexer add/drop subsystem circuitry, telecommunication operations, or the like may each benefit from the temperature-stable reference wavelength.

Regardless of the final application of the adjustment techniques, at block 104, the computing device 44 and/or suitable controller may report the adjusted sensor wavelength (e.g., the absolute wavelength value). This value may be reported for storage, analysis, processing, or the like. In this way, the value may be stored in any valid data store, such as a database or a table, for future or concurrent use. For example, at block 106, the adjusted sensor wavelength may be converted into a sensed parameter, such as temperature or strain, by the computing device 44 and/or suitable controller.

Figure 4A:
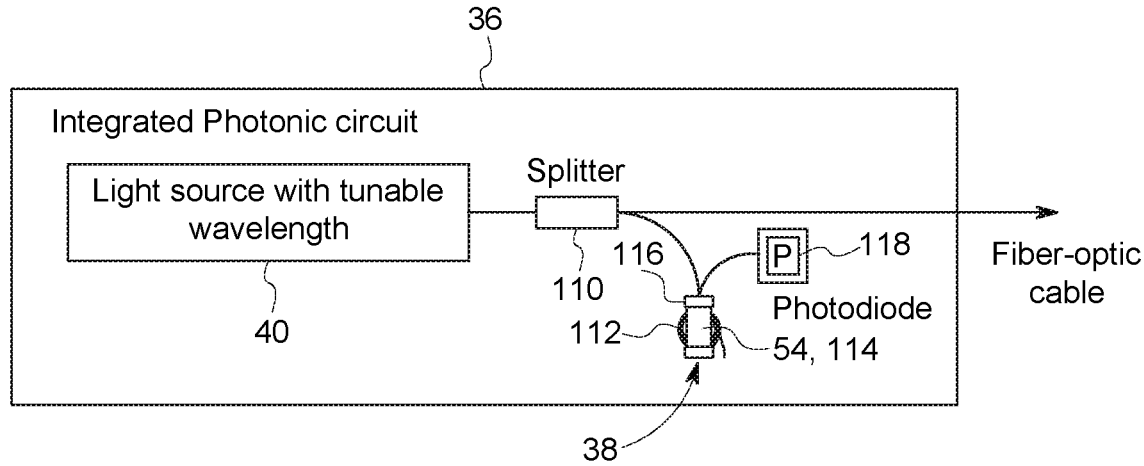
FIG. 4A is a block diagram of an example of the wavelength reference of FIG. 2, in accordance with aspects of the present approach.

Elaborating on arrangements of the wavelength reference 38, FIG. 4A is a block diagram of an example of the wavelength reference 38. As depicted, the integrated photonic circuit 36 includes the light source 40 that may have a tunable wavelength, as described above. Coupled to the light source 40 is a splitter 110. The splitter 110 may help to transmit a portion of a light generated by the light source 40 to the wavelength reference 38.

The wavelength reference 38, as depicted, includes a spiral Bragg grating 112 (e.g., waveguide structure) underneath a thermistor 114 and, optionally, disposed above underfill material 116 (e.g., epoxy, thermal grease, microgap pad). The spiral Bragg grating 112 may receive light at one end and transmit or reflect portions of the light. In this way, light transmitted through or reflected from the spiral Bragg grating 112 may be attenuated, filtered, or altered. The filtering of the light is affected by ambient temperature conditions associated with the spiral Bragg grating 112. The thermistor 114 may operate as the temperature sensor 54 and thus may sense the ambient temperature conditions associated with the spiral Bragg grating 112. The thermistor 114 may be a ceramic sensor, where temperature sensed is a function of resistance change as described above with respect to Equation 1.

After the portion of the light transmits through the wavelength reference 38, the portion of light transmits to a photodiode 118. The photodiode 118 operates as conversion circuitry, converting one or more optics signals into one or more electrical signals for interpretation and/or processing by the computing device 44. After conversion into the one or more electrical signals, the memory and/or processing circuitry 48 may process, interpret, adjust, or the like the one or more electrical signals for use in photonic circuit operations. For example, the memory and/or processing circuitry 48 may follow the method 86 of FIG. 3 to determine and perform an adjustment to the estimated wavelength of the sensor to compensate for temperature variation associated with optical transmission through the wavelength reference 38.

This depicted example may be used in a variety of suitable ways to perform a variety of tasks. One example of a task is determining the output wavelength of the light source 40 when the output wavelength is unknown. The wavelength reference 38 may reflect strongly (e.g., relatively strong) into the photodiode 118 when the wavelength of the light source 40 is equal to the peak of the reflectance of the wavelength reference (e.g., grating). The peak wavelength (e.g., maximum wavelength) of the wavelength reference 38 may change over time in accordance with the following equation:

$$\text{peak}(T) = \text{peak0} + T*\text{delta} \qquad [2]$$

In Equation 2, T represents temperature, peak0 represents a peak wavelength at a nominal temperature, and delta represents a constant. The temperature of the wavelength reference 38 may vary in an unknown way due at least in part to the presence of active circuitry and/or device disposed on or near the integrated photonics circuit. However, by monitoring the temperature of the wavelength reference 38, the peak wavelength may be determined and used to calibrate the output wavelength of the light source.

Figure 4B:
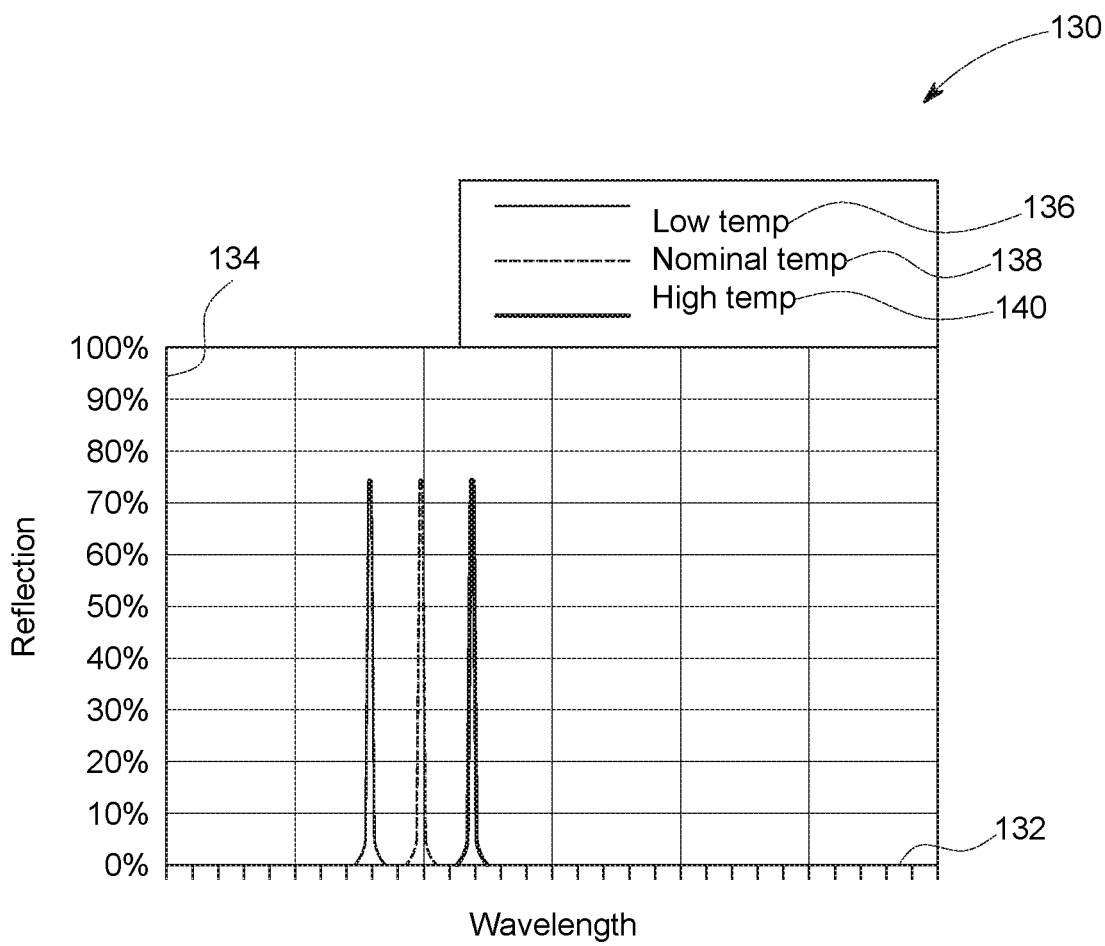
FIG. 4B is a graph of a response of the wavelength reference of FIG. 4A to varied temperature conditions, in accordance with aspects of the present approach.

To help explain, FIG. 4B is a graph 130 of a simulated response of the integrated photonic circuit 36 of FIG. 4A using different ambient temperatures. The light transmitted into the wavelength reference 38 is a light variably tuned across a frequency band in this simulation. In particular, the graph 130 depicts a change in wavelength (e.g., axis 132) compared to percent reflected (e.g., axis 134) for three datasets. That is, a first dataset (e.g., corresponding to line 136) represents a light reflected from the wavelength reference 38 at a first temperature (e.g., a low temperature relative to the other temperatures). A second dataset (e.g., corresponding to line 138) represents a light reflected from the wavelength reference 38 at a second temperature (e.g., a nominal temperature relative to the other temperatures). A third dataset (e.g., corresponding to line 140) represents a light reflected from the wavelength reference 38 at a third temperature (e.g., a high temperature relative to the other temperatures). It is noted that relative temperature values are sufficient for purposes of explaining an effect of temperature on wavelengths.

As described above, when the output wavelength of the light source 40 matches the wavelength of the wavelength reference 38, the light reflection value is relatively high (e.g., above 50%, such as around 75% reflection). Thus, as depicted on the graph, at the different temperatures, different wavelengths are matched between the wavelength reference 38 and the light source 40. By monitoring the temperature of the wavelength reference 38, the maximum wavelength (e.g., peak wavelength) may be known and used to calibrate the light source 40 to a particular output wavelength.

Figure 5A:
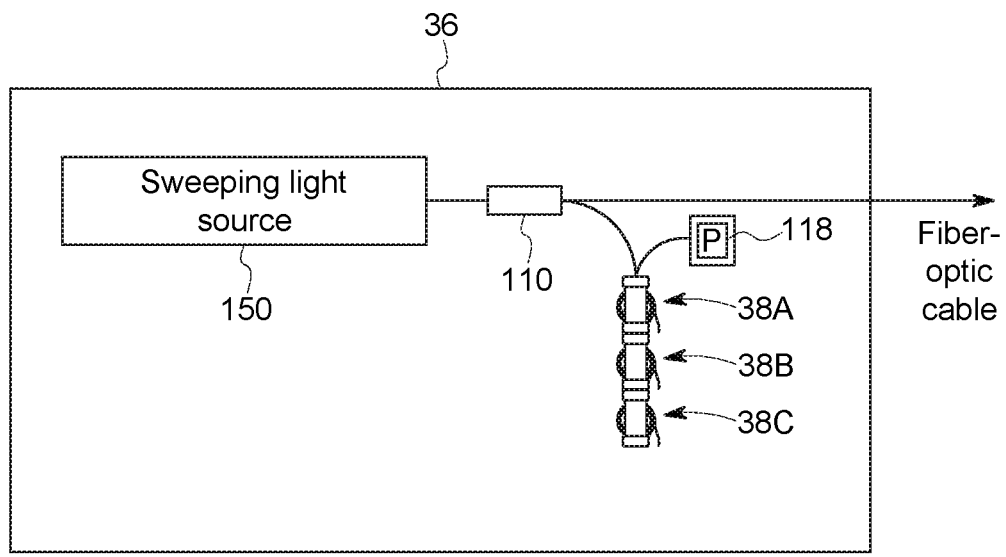
FIG. 5A is a block diagram of another example of the wavelength reference of FIG. 2, in accordance with aspects of the present approach.

FIG. 5A is a block diagram of another example of the wavelength reference 38. As depicted, the integrated photonic circuit 36 includes a sweeping light source 150 that may have a tunable wavelength, as described above. Coupled to the sweeping light source 150 is the splitter 110. As described above, the splitter 110 may help to transmit a portion of a light generated by the sweeping light source 150 to multiple of the wavelength reference 38. In this example, three wavelength references 38 (e.g., 38A, 38B, 38C) are included as gratings for three different wavelengths.

The sweeping light source 150 may output light at a variety of wavelengths as it sweeps from a first wavelength value to a second wavelength value. As the sweeping light source 150 sweeps, the light outputted may have an unknown wavelength between the first wavelength value and the second wavelength value. The wavelength references 38 may be included to help identify when source wavelength (e.g., light outputted by the sweeping light source 150) equals a wavelength of one of the wavelength references 38. As the sweeping light source 150 sweeps (e.g., transmits separate lights at different times at differing wavelengths between the first wavelength value to the second wavelength value), three distinct high signals may be recorded by the photodiode 118 when the source wavelength equals the wavelength of one of the wavelength references. Thus, by measuring a temperature associated with each of the wavelength references 38, the exact wavelength of the reference wavelength may be known (e.g., since the wavelength of the wavelength reference may change with temperature variations) and used to calibrate the wavelengths of the sweeping light source 150.

Figure 5B:
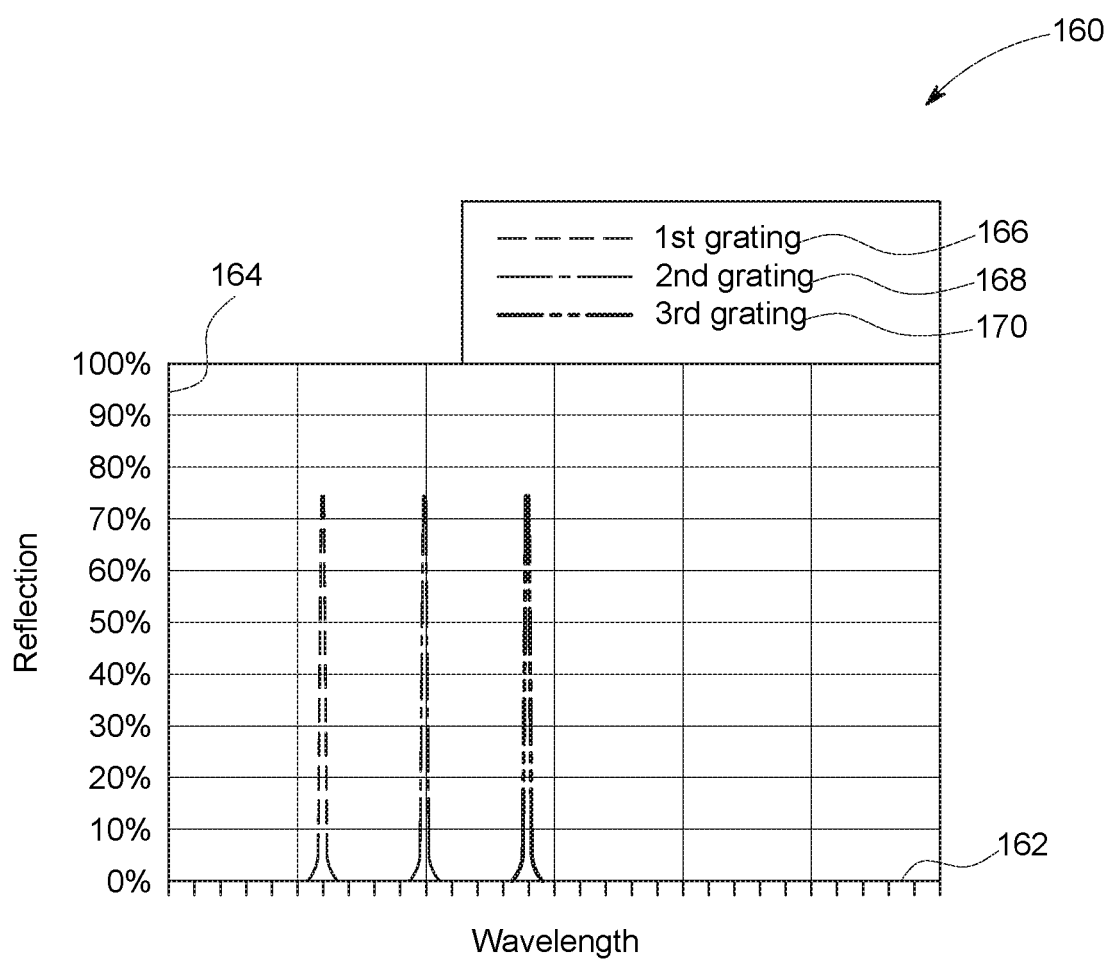
FIG. 5B is a graph of a response of the wavelength reference of FIG. 5A to varied gratings at a constant temperature condition, in accordance with aspects of the present approach.

To help explain, FIG. 5B is a graph 160 of a simulated response of the integrated photonic circuit 36 of FIG. 5A using a same ambient temperature but different gratings (e.g., one or more wavelength references similar to wavelength reference 38). The light transmitted to the wavelength references 38 (e.g., 38A, 38B, 38C) is a light variably tuned across a frequency band in this simulation defined by the first wavelength and the second wavelength and outputted by the sweeping light source 150. In particular, the graph 160 depicts a change in wavelength (e.g., axis 162) compared to percent reflected (e.g., axis 164) for three datasets. In this example, the photodiode 118 may sense outputs from the wavelength references 38. But, since the sweeping light source 150 transmits multiple lights at different wavelengths at different times, the one photodiode 118 may capture separate datasets during the sweep. In this way, three of the datasets may correspond to the three responses of the three depicted wavelength references (e.g., wavelength reference 38), and these three datasets are depicted on the graph.

Thus, a first dataset (e.g., corresponding to line 166) represents a light reflected from the wavelength reference 38A at a first time that matches a wavelength of the wavelength reference 38A. A second dataset (e.g., corresponding to line 168) represents a light reflected from the wavelength reference 38B at a second time that matches a wavelength of the wavelength reference 38B. A third dataset (e.g., corresponding to line 170) represents a light reflected from the wavelength reference 38C at a third time that matches a wavelength of the wavelength reference 38C.

As described above, when the output wavelength of the light source 150 matches the wavelength of the one of the wavelength references 38, the light reflection value is relatively high (e.g., above 50%, such as around 75% reflection). Thus, as depicted on the graph, at the different temperatures, different wavelengths are matched between the wavelength references 38 and the light source 150. By monitoring the temperature of each of the wavelength references 38, the maximum wavelength for each of the wavelength references 38 may be known and used to calibrate the wavelengths of the sweeping light source 150.

Figure 6:
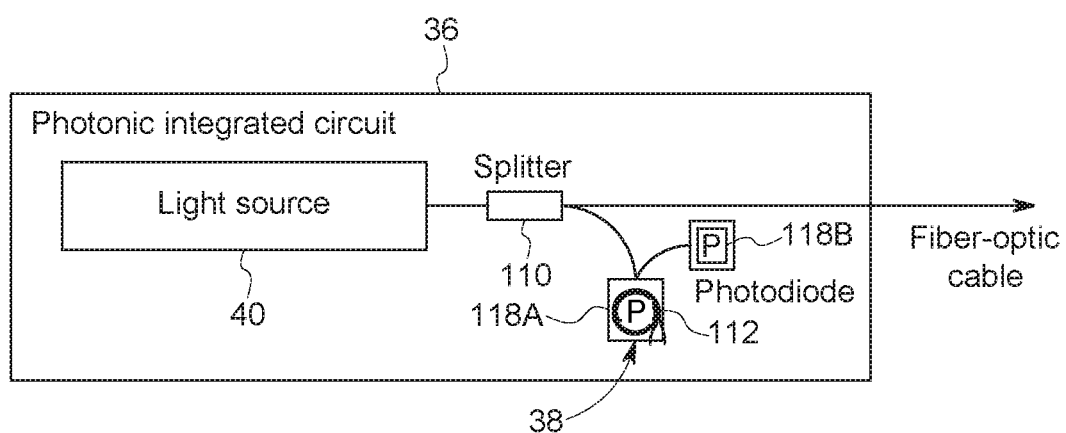
FIG. 6 is a block diagram of another example of the wavelength reference of FIG. 2, in accordance with aspects of the present approach.

FIG. 6 is a block diagram of another example of the wavelength reference 38. As depicted, the integrated photonic circuit 36 includes the light source 40 that may have a tunable wavelength, as described above. Coupled to the light source 40 is the splitter 110. As described above, the splitter 110 may help to transmit a portion of a light generated by the sweeping light source 150 to the wavelength reference 38. In this example, however, the temperature associated with the wavelength reference 38 is sensed using a photodiode 118A where the wavelength of the light outputted by the wavelength reference is sensed by a photodiode 118B, in a similar manner as described above. In particular, in some embodiments, the photodiode 118A is disposed within a center or middle of the spiral Bragg grating 112 (e.g., depicted as coiled). The photodiode 118A, in some cases, is the same component as the photodiode 118B, and thus the integrated photonic circuit 36 includes one photodiode (e.g., photodiode 118B) used to record the light outputs (e.g., convert optical signals into electrical signals) and sense temperature. In these embodiments, the one photodiode may be switched from one operation to the other, for example from sensing temperature to recording light outputs.

The photodiode 118A may be exposed to a constant light level near the wavelength reference 38. When exposed to constant light levels, the photodiode 118A may output different amounts of current in response to temperature variations. For example, when the ambient temperature associated with the photodiode 118A is higher than an initial temperature, a current output from the photodiode 118A may change a trackable and detectable amount to be correlated over time to changes in temperature. This data may be leveraged to determine the ambient temperature associated with the wavelength reference 38. An alternative or additional way of sensing temperature using a photodiode (e.g., photodiode 118A) is to bias the photodiode in forward conduction with a fixed small current, for example, 10 nano-amperes (nA), as to not create self-heating. The voltage drop across the diode changes when the temperature of the diode changes, and thus may be leveraged or used to monitor and/or measure temperature variations. When using the photodiode to sense temperature in this way, the photodiode should be shielded from light to avoid signal disturbances from light.

Figure 7A:
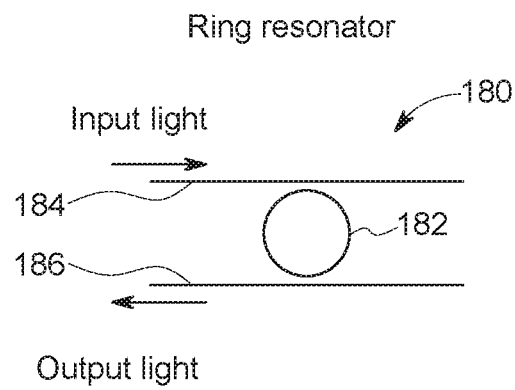
FIG. 7A is an illustration of an example of a waveguide structure for use in the wavelength reference of FIG. 2, in accordance with aspects of the present approach.

Various wavelength reference 38 embodiments have been described using the spiral Bragg grating 112 waveguide structure. However, any suitable structure may be used within the wavelength reference 38. For example, a Bragg grating not in a spiral shape may be used. FIG. 7A is an illustration of another example of a waveguide structure and depicts a ring resonator 180 waveguide structure for the wavelength reference 38. The ring resonator 180 may include a closed loop 182 coupled to a light input 184 and a light output 186. When light having a wavelength equal to a resonant wavelength of the ring resonator 180 is input, the light recorded at conversion circuitry, such as the photodiode 118B, may generate a relatively larger electrical signal than light recorded not having a wavelength equal to the resonant wavelength. This is similar to the spiral Bragg grating 112 waveguide structure of at least, for example, FIG. 5A. Thus, in a similar way as described above, the ring resonator 180, after calibration such that any differences in resonant wavelength may be adjusted in response to ambient temperatures, may be used to determine (and calibrate) a light source outputting light at an unknown wavelength.

Figure 7B:
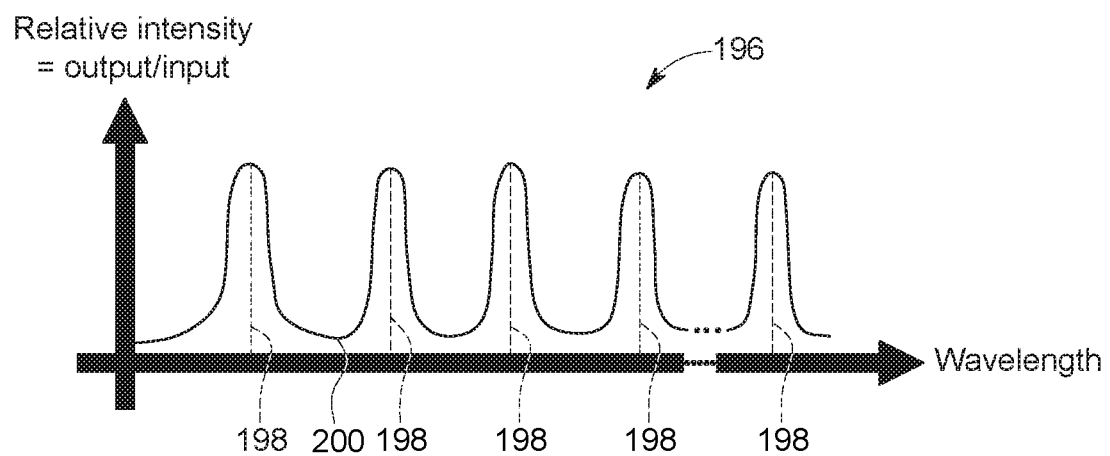
FIG. 7B is a graph of an output/input response of the waveguide structure of FIG. 7A, in accordance with aspects of the present approach

Similar to how FIG. 5B generally depicts reflection (e.g., as a percentage of output light vs input light) of light associated with the wavelength reference 38 of FIG. 5A, FIG. 7B is a graph 196 of a generalized, example response of a wavelength reference 38 including the ring resonator 180 of FIG. 7A to a varying wavelength input at a same ambient temperature. Maximum wavelengths, such as wavelength multiples 198, may correspond to a resonant wavelength of the ring resonator 180 and the other wavelengths (e.g., wavelength 200) represent values other than the resonant wavelength. In this way, the computing device 44 may analyze relative intensity data of light transmitted through the ring resonator 180 to identify which wavelengths (e.g., unknown, associated with a sweeping operation) of the light transmitted match the resonant wavelengths. As may be appreciated by one of skill in the art, a resonant wavelength is associated with a fundamental frequency that may be repeated on a periodic basis, as depicted in the graph 196. For example, the sweeping light source 150 may transmit a variety of unknown wavelengths to the ring resonator 180, which may cause a relative signal intensity of the light output to attenuate (e.g., decrease) when the wavelength of the light is not at a resonant wavelength (e.g., a multiple of a fundamental resonant wavelength).

Figure 8A:
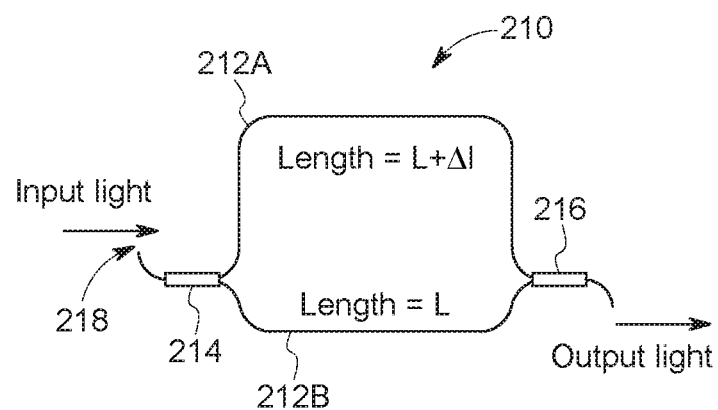
FIG. 8A is an illustration of another example of a waveguide structure for use in the wavelength reference of FIG. 2, in accordance with aspects of the present approach.

FIG. 8A is an illustration of another example of a waveguide structure for use in the wavelength reference 38. As depicted, the waveguide structure is an imbalanced Mach Zehnder interferometer 210. The imbalanced Mach Zehnder interferometer 210 waveguide may include one or more transmission structures 212 (e.g., 212A, 212B), a splitter 214, and a combiner 216. A first end 218 of the imbalanced Mach Zehnder interferometer 210 waveguide structure receives input light, which is divided evenly by the splitter 214 to travel down the transmission structures 212. After transmission, the light is combined at the combiner 216 before transmitting to conversion circuitry, such as the photodiode 118, for recordation by the computing device 44. The transmission structure 212A may be longer (e.g., by a predetermined Δ1 value, where Δ1 represents a difference in length between the transmission structures 212) than the transmission structure 212B, thus making the structure imbalanced. The imbalanced Mach Zehnder interferometer 210 waveguide may be a resonant structure that transmits light matching a resonant wavelength at a high relative intensity when compared to light transmitted that does not have the resonant wavelength. This is similar to the operation of the ring resonator 180.

Figure 8B:
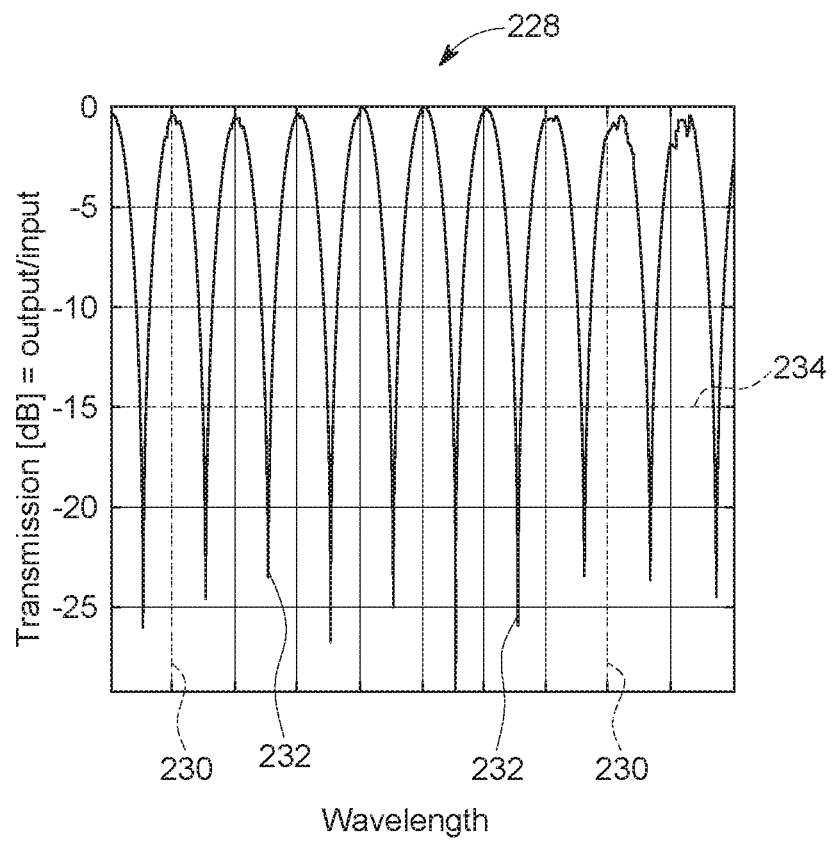
FIG. 8B is a graph of an output/input response of the waveguide structure of FIG. 8A, in accordance with aspects of the present approach.

FIG. 8B is a graph 228 of relative intensities (e.g., an output/input response) associated with light transmission through the imbalanced Mach Zehnder interferometer 210. As described above, the imbalanced Mach Zehnder interferometer 210 may have a particular resonant wavelength where light having a wavelength similar to the resonant wavelength (e.g., wavelength 230) is permitted to transmit through for recordation (e.g., thus, has a high relative intensity sufficiently above level 234) but light not having the resonant wavelength (e.g., wavelength 232) may attenuate significantly (e.g., having a low relative intensity at below or near level 234) before being outputted for recording. In a similar way as described above, this circuitry may be used to calibrate a light source 150 which outputs light at unknown wavelengths. For example, light with an unknown wavelength may be transmitted during a sweeping operation through the imbalanced Mach Zehnder interferometer 210 until the photodiode 118 detects a high relative intensity level associated with a resonant frequency of the wavelength reference 38.

Figure 9A:
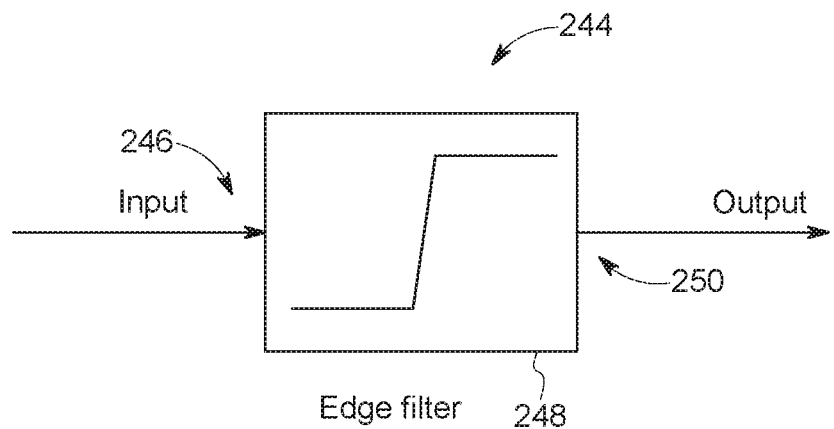
FIG. 9A is an illustration of another example of a waveguide structure for use in the wavelength reference of FIG. 2, in accordance with aspects of the present approach.

FIG. 9A is an illustration of yet another example of a waveguide structure for use in the wavelength reference 38. As depicted, the waveguide structure is an edge filter 244. A first end 246 of the edge filter 244 receives input light. The input light may transmit through filtering circuitry 248, where light having a particular wavelength is transmitted through but generally stopped from transmitting if the light does not have the wavelength. Output light is then transmitted to conversion circuitry from a second end 250, such as the photodiode 118, for recordation and analysis by the computing device 44.

Figure 9B:
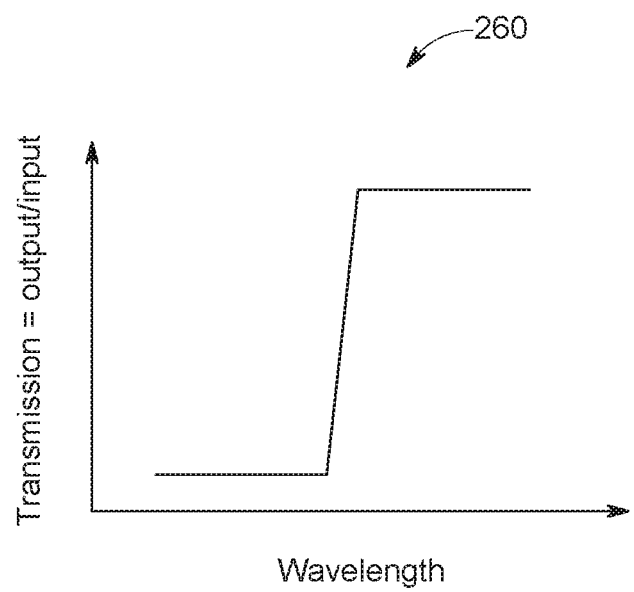
FIG. 9B is a graph of an output/input response of the waveguide structure of FIG. 9A, in accordance with aspects of the present approach.

FIG. 9B is a graph 260 of an output/input response of the edge filter 244. As described above, the edge filter 244 may have a particular filter wavelength where light having a wavelength above the filter wavelength is permitted to transmit through for recordation (e.g., thus, has a high relative intensity). In a similar way as described above, this circuitry may be used to calibrate a light source 40 which outputs light at unknown wavelengths. For example, light with an unknown wavelength may be transmitted through the edge filter 244 while adjusting the wavelength of the light until the step of the filter circuitry 248 is reached and a high relative intensity signal is received at the conversion circuitry.

As described above, many suitable combinations of waveguides and temperature sensors may be used to apply benefits of this disclosure. In particular, any one of the edge filter 244, the imbalanced Mach Zehnder interferometer 210, the ring resonator 180, the spiral Bragg grating 112, or the like, may be used with any one of the photodiode 118A, the thermistor 114, a RTD, a thermocouple and/or thermopile, a simistor (e.g., positive temperature slope resistor made from silicon), a complementary metal-oxide-semiconductor (CMOS) temperature sensor (may be based at least in part on PNP transistors), a lightly doped silicon embedded resistor, a global temperature and energy controller, a heater or micro-heater, or the like may each be used to maintain the integrated photonic circuit 36 at a desired temperature to reduce temperature variations or may be used to sense an associated temperature to compensate for temperature variations. For example, in some embodiments, the temperature sensor may be part of a temperature control loop, where the temperature sensed by the temperature sensor is transmitted to control logic circuitry that changes one or more operations of the integrated photonic circuit 36 based on one or more temperature measurements.

Similar to how many variations of temperature sensors and/or waveguide structures may be used to leverage benefits of this disclosure, any suitable technique of transmitting a light pulse may be used in combination with techniques described in FIG. 3. In particular, FIG. 10 depicts one example method of how a light pulse may be transmitted to leverage benefits of this disclosure.

Figure 10:
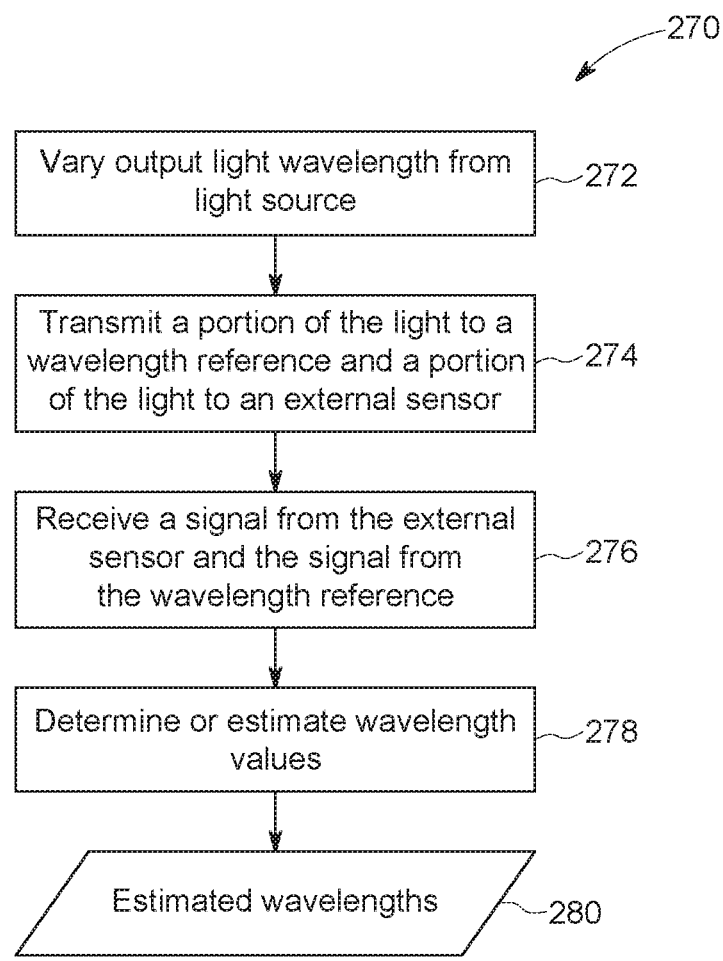
FIG. 10 is a flowchart of a method associated with operating the integrated photonic circuit of FIG. 2 using the method of FIG. 3, in accordance with aspects of the present approach.

FIG. 10 depicts a flowchart of a method 270 for operating the integrated photonic circuit 36 and/or the optical sensing system 34. Although the following description of the method 270 is detailed in a particular order to facilitate explanation, it should be noted that the steps of the method 270 may be performed in any suitable order. Moreover, although the method 270 is described as being performed by the computing device 44, it should be understood that the method 270 may be performed by any suitable computing device or controller. It should be understood that FIG. 10 generally depicts operations that occur at blocks 88-96 of FIG. 3.

As described above, the computing device 44 and/or suitable controller may operate the light source 40 to transmit light (e.g., light pulse, laser pulse) to the active circuitry 46, such as at block 272, by sweeping across wavelengths within specified band of interest. Before operating the light source 40, the wavelength reference 38 of the optical sensing system 34 may be calibrated using the method 64, and thus one or more responses to temperature variations may be associated with adjustments in a memory of the computing device 44 and/or suitable controller, as discussed above. Sweeping the light source 40 may include transmitting a portion of the generated light, at block 274, to the wavelength reference 38 and transmitting a different portion of the generated light to the fiber cable 42.

At block 276, the computing device 44 and/or suitable controller may receive a signal from an external sensor associated with the fiber cable 42 and a signal from the wavelength reference 38. The external sensor may include any suitable technology to determine and return information about the wavelength or estimated wavelength of the portion of the generated light transmitted to the fiber cable 42. The wavelength reference 38 may include a photodiode to record the optical signals associated with the portion of light transmitted and to translate the optical signals into electrical signals interpretable by the computing device 44 and/or suitable controller. Based at least in part on these signals, the computing device 44 and/or suitable controller may determine or estimate a wavelength associated with the light transmitted by the light source 40 at block 278. This determined or estimated wavelength, however, may still not be an absolute wavelength due to an influence of temperature variations. Thus, an estimated wavelength output 280 resulting from the determination or estimation described above may be used in the previously described adjustment operations (e.g., compensation operations) at the block 96 and the blocks 102-106.

Technical effects of this disclosure include designs and methods of manufacturing wavelength references in integrated photonics circuitry that reduce system sensitivity to temperature variations. In particular, the disclosed wavelength references include a temperature sensor disposed near or on a waveguide of the wavelength reference, yielding a real-time indication of ambient temperature at the wavelength reference. Computing circuitry associated with integrated photonics circuitry may determine one or more adjustments to perform to one or more determined wavelengths to suitably compensate for temperature variations at the wavelength reference. Accordingly, the resulting wavelength reference may provide a stable reference wavelength for use in various photonics operations.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An integrated photonic circuit, comprising:
a wavelength reference coupled to a source of light with spectral content and configured to estimate a first wavelength of light, wherein the wavelength reference comprises a waveguide structure, and wherein the waveguide structure is formed at least in part from silicon, silicon nitride, silica, or indium phosphide;
a temperature sensor configured to sense a temperature associated with the wavelength reference; and
a processing component configured to perform an adjustment to the estimate of the first wavelength of light based at least in part on the sensed temperature.

2. The integrated photonic circuit of claim 1, wherein the temperature sensor is communicatively coupled to additional circuitry as part of a control loop configured to change an operation in response to variations in the temperature associated with the wavelength reference.

3. The integrated photonic circuit of claim 1, wherein the processing component is configured to perform a calibration to determine a known temperature dependence of the wavelength reference, wherein the known temperature dependence of the wavelength reference is used by the processing component to at least in part determine the adjustment to the estimate of the first wavelength of light.

4. The integrated photonic circuit of claim 1, wherein the waveguide structure comprises a Bragg grating, a spiral Bragg grating, an unbalanced Mach Zehnder interferometer, a ring resonator, an edge filter, or any combination thereof.

5. The integrated photonic circuit of claim 1, comprising a photodiode or a thermistor as the temperature sensor.

6. The integrated photonic circuit of claim 1, wherein the temperature sensor is configured as a resistance temperature detectors (RTD), a thermocouple, a thermopile, a simistor, a complementary metal-oxide-semiconductor (CMOS) temperature sensor, a lightly doped silicon embedded resistor, a global temperature and energy controller, a heater, or any combination thereof.

7. The integrated photonic circuit of claim 1, wherein the wavelength reference is disposed on an underfill material comprising epoxy, thermal grease, a micro-gap pad, or any combination thereof.

8. The integrated photonic circuit of claim 1, comprising one or more additional wavelength references coupled in series with the wavelength reference.

9. A method, comprising:
operating a light source to emit light into an integrated photonic circuit comprising active circuitry that emits heat during an operation;
transmitting a first portion of the light to a wavelength reference, wherein the wavelength reference has a sensitivity to the heat from the active circuitry;
estimating a wavelength value of a second portion of the light;
determining an operating temperature associated with a time at which a peak light energy of the first portion of the light was transmitted into the wavelength reference;
determining an adjustment to apply to an estimate of the wavelength value of the second portion of the light based at least in part on the operating temperature and a known temperature dependence of the wavelength reference; and
compensating for a change in performance by the wavelength reference caused by temperature variation by applying the adjustment to the estimate of the wavelength value of the second portion of the light to generate an absolute wavelength value.

10. The method of claim 9, wherein determining the adjustment comprises referencing a look-up table comprising one or more indications of a behavior of the wavelength reference to one or more temperature variations of the operating temperature.

11. The method of claim 9, comprising defining the known temperature dependence of the wavelength reference by performing a calibration at an earlier time.

12. The method of claim 9, comprising:
monitoring a plurality of wavelengths estimated via the wavelength reference;
determining when a sweeping light source generates light at a same wavelength as the wavelength reference by determining when a plurality of amplitudes comprises a maximum wavelength estimate outputted from the wavelength reference, wherein the sweeping light source is configured to generate a plurality of light pulses at unknown wavelengths; and
calibrating the sweeping light source based at least in part on when the light is generated at the same wavelength as the wavelength reference.

13. The method of claim 9, wherein determining the operating temperature includes sensing the operating temperature using a temperature sensor disposed within a waveguide structure of the wavelength reference.

14. The method of claim 9, wherein determining the adjustment comprises:
determining a first adjustment as the adjustment in response to the operating temperature being a first value or determining a second adjustment as the adjustment in response to the operating temperature being a second value.

15. A device, comprising:
active circuitry; and
a wavelength reference coupled to the active circuitry, comprising:
a waveguide structure formed from a material sensitive to temperature variations caused by a thermal gradient associated with the active circuitry; and
a temperature sensor disposed near the waveguide structure configured to sense an ambient temperature near the waveguide structure, wherein the waveguide structure comprises a spiral Bragg grating, and wherein the temperature sensor is disposed at a center of the spiral such that the waveguide structure coils around a circumference of the temperature sensor.

16. The device of claim 15, wherein the temperature sensor is disposed on the waveguide structure, and wherein the temperature sensor is configured to sense temperature based on a change in resistance.

17. The device of claim 15, wherein the waveguide structure is formed from the material comprising silicon indium phosphide, silicon nitride, or silicon dioxide.

18. The device of claim 15, wherein the waveguide structure comprises a Bragg grating, a spiral Bragg grating, an unbalanced Mach Zehnder interferometer, a ring resonator, an edge filter, or any combination thereof.

19. The device of claim 15, wherein the temperature sensor is also used as conversion circuitry to generate electrical signals from optical signals.

20. The device of claim 15, wherein the temperature sensor comprises a photodiode and is separate from conversion circuitry of the wavelength reference.

* * * * *